United States Patent [19]
Sudo et al.

[11] Patent Number: 5,129,868
[45] Date of Patent: Jul. 14, 1992

[54] QUICK-RETURN MOTION MECHANISM OF AUTOMATIC MAGNETIC DRILLING MACHINE

[75] Inventors: Junichi Sudo; Masateru Niyada, both of Katsuta; Shigeru Shinohara, Mito, all of Japan

[73] Assignee: Hitachi Koki Company Limited, Tokyo, Japan

[21] Appl. No.: 611,590

[22] Filed: Nov. 13, 1990

[30] Foreign Application Priority Data

Dec. 1, 1989 [JP] Japan .................... 1-139972

[51] Int. Cl.⁵ .............................................. F16H 1/32
[52] U.S. Cl. .................... 475/177; 192/12 B
[58] Field of Search ............... 475/176, 177, 162; 192/12 B, 12 R, 12 D, 17 C

[56] References Cited

U.S. PATENT DOCUMENTS

| | | | |
|---|---|---|---|
| 1,697,495 | 1/1929 | Davis | 475/175 |
| 2,217,183 | 10/1940 | Ross | 192/12 B |
| 3,561,292 | 2/1971 | Lorence | 475/176 X |
| 4,454,937 | 6/1984 | Yang | 192/12 B |
| 4,732,016 | 3/1988 | Hirooka et al. | 192/17 C |

FOREIGN PATENT DOCUMENTS

| | | | |
|---|---|---|---|
| 2332842 | 1/1975 | Fed. Rep. of Germany | 475/176 |
| 55-155944 | 12/1980 | Japan | 475/176 |

*Primary Examiner*—Dwight Diehl
*Attorney, Agent, or Firm*—Lowe, Price, LeBlanc & Becker

[57] ABSTRACT

A quick-return motion mechanism for use in an automatic magnetic drilling machine including a feed motor for generating power transferred through a worm wheel and a high-ratio reduction gear to a handle shaft to drive an electric drill. A one-way clutch is provided inside the worm wheel so that the handle shaft races on feed and is locked on return. The high-ration reduction gear is composed of elements which are arranged to cause the input and output sides of the high-ratio reduction gear to rotate in the same direction. The quick-return motion mechanism consists of an arrangement for restraining the input side element of the high-ratio reduction gear on feed and for releasing it on return to race the high-ratio reduction gear.

2 Claims, 5 Drawing Sheets

| TRANSMISSION MEMBER | FEED | RETURN |
|---|---|---|
| WORM WHEEL INPUT SIDE OF REDUCTION GEAR | ↻<br>NO./i1×i2 | ↺<br>NO./i1×i2 |
| CLUTCH (6) OUTPUT SIDE OF REDUCTION GEAR | ↻<br>NO./i1×i2×i3 | ↺<br>NO./i1×i2×i3 |
| CLUTCH (7) HANDLE SHAFT | ↻<br>NO./i1×i2×i3 | ↺<br>NO./i1×i2 |
| RELATIVE RELATION BETWEEN ONE-WAY CLUTCH AND HANDLE SHAFT | | |
| RELATION BETWEEN CLUTCHES (6,7) | ENGAGE | SLIP |

QUICK-RETURN MOTION MECHANISM OF AUTOMATIC MAGNETIC DRILLING MACHINE

BACKGROUND OF THE INVENTION

The present invention relates to a quick-return motion mechanism for use in automatic magnetic drilling machines.

One known quick-return motion mechanism for use in automatic magnetic drilling machines is constructed as depicted in FIG. 1, wherein power generated from feed motor 1 is transferred through a pinion 1a, a first gear (toothed-wheel) 2, a worm 3, a worm wheel 4, a high-ratio reduction gear 5 and clutches 6, 7 to a handle shaft 8 so as to move an electric drill up and down. The worm wheel 4 is fixed to the input side of the high-ratio reduction gear 5. A one-way clutch 9 is disposed inside the worm wheel 4 such that the handle shaft 8 races on feeding and is locked on returning. The high-ratio reduction gear 5 is arranged s as to take the same rotational direction at the input and output sides, and the clutch 6 is fixed to the output side of the high-ratio reduction gear 5. As depicted in FIG. 2, the engaging surfaces 6a and 7a of the clutches 6 and 7 are engaged with each other with a given angle θ so that a spring 10 is compressed in response to application of a certain transmission torque and hence the clutch 7 retreats in the rotational direction so as to slip. In FIG. 1, numeral 11 represents a stopper for the clutch 7, 5a designates elements, 12 depicts a gear cover, and 13 denotes a bolt.

With reference to FIG. 3 when the feed motor 1 rotates in the left direction (clockwise), the first gear 2 rotates in the right direction (counterclockwise), so that power is transferred to the worm wheel 4, the high-ratio reduction gear 5 and the clutches 6, 7 whereby the handle shaft 8 rotates in the right direction. The worm wheel 4 relatively rotates in the right direction with respect to the handle shaft 8. In this case, the clutches 6 and 7 engage each other. The reduction ratio up to the handle shaft 8 is i1 × i2 × i3 and the rotational speed is NO/i1, i2, i3, where i1 is the reduction ratio of the pinion 1a and the first gear 2, i2 is the reduction ratio of the worm 3, i3 is the reduction ratio of the high-ratio reduction gear, and NO is the rotational speed of the feed motor 1. On returning, in response to the right rotation of the feed motor 1, the first gear 2 rotates in the left direction and the power is transferred to the worm wheel 4 and the high-ratio reduction gear 5 whereby the clutch 6 rotates in the left direction with a rotational speed of NO/i1, i2, i3. On the other hand, the one-way clutch 9 causes the worm wheel 4 and the handle shaft 8 to be locked, and the handle shaft 8 and the clutch 7 rotate at a rotational speed of NO/i1, i2 which is equal to that of the worm wheel 4. The clutch 6 is locked with the clutch 7 which in turn, slips when exceeding the slip torque, and the handle shaft 8 rotates at a rotational speed of NO/i1, i2.

Although as described above the rotational speed on returning is i3 times of the rotational speed on the feeding so as to increase the rotational speed of the feed motor 1, there is a problem which arises with such a mechanism, i.e., when the thrust of the electric drill is great, the clutch starts to slip so as to make drilling difficult. Further, if increasing the slip torque in correspondance with the drilling thrust, the feed motor 1 is locked on return so as to make difficult the quick-return operation.

SUMMARY OF THE INVENTION

It is therefore an object of the present invention to provide a quick-return motion mechanism in an automatic magnetic drilling machine which is capable of quickly and surely performing the quick-return operation.

According to the present invention, there is provided a quick-return motion mechanism for use in an automatic magnetic drilling machine including a feed motor for generating power which is in turn transferred through a worm wheel and a high-ratio reduction gear to a handle shaft so as to drive an electric drill. A one-way clutch is provided inside the worm wheel so that the handle shaft races on feed and is locked on return. The high-ratio reduction gear is composed of elements which are arranged to cause the input and output sides of the high-ratio reduction gear to rotate in the same direction. One feature of the present invention is that the quick-return motion mechanism comprises an arrangement for restraining the input side element of the high-ratio reduction gear on feed and for releasing it on return to race the high-ratio reduction gear. The arrangement is comprised of a clutch fixed to the input side element of the high-ratio reduction gear, a stopper having at one end a roller engageable with the clutch fixed secured thereto, a plunger coupled to the other end of the stopper, and a solenoid coil around the plunger to attract the plunger.

DETAILED DESCRIPTION OF THE INVENTION

Figure 1:
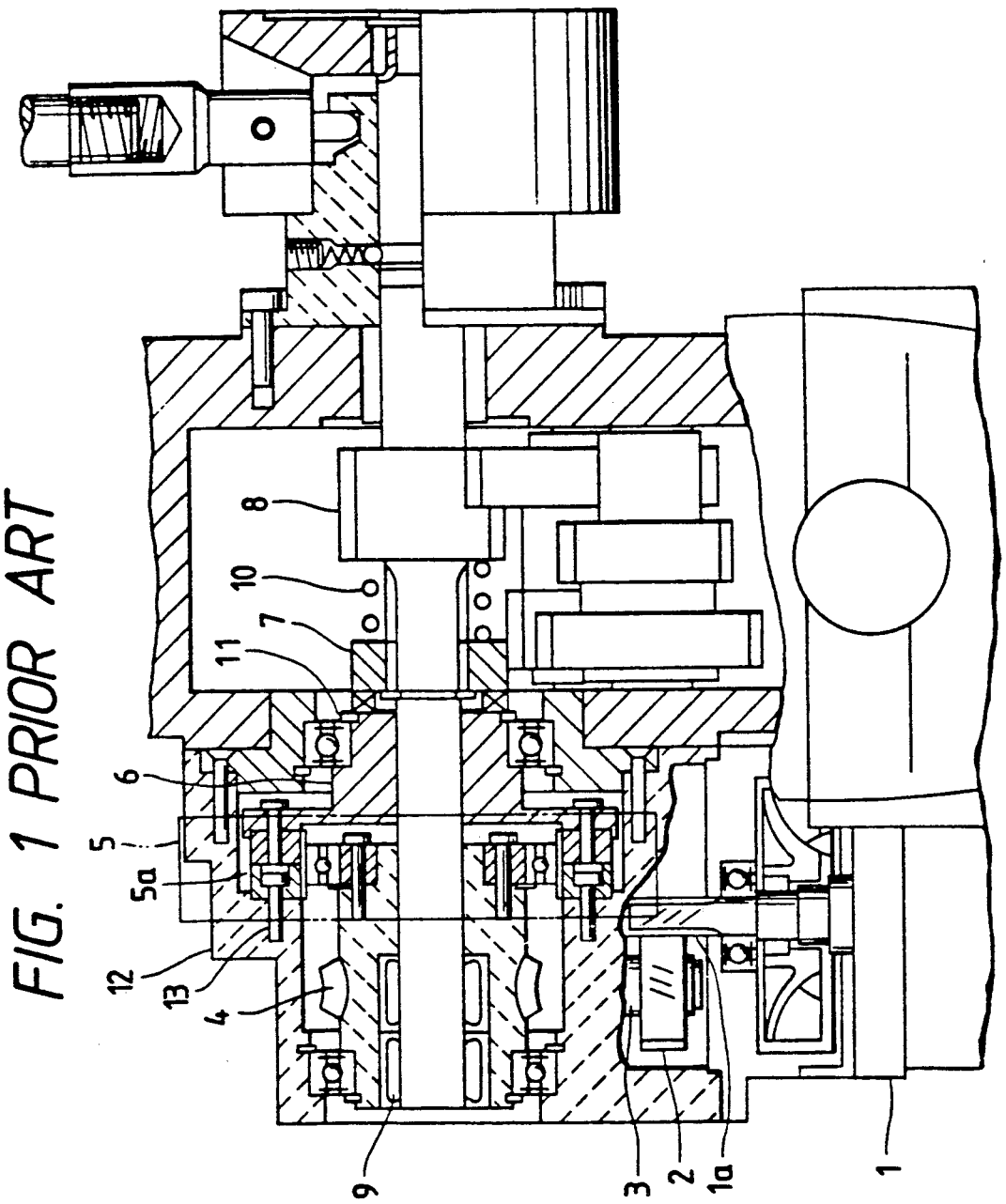
FIG. 1 is a cross-sectional view of a conventional quick-return motion mechanism for use in an automatic magnetic drilling mechanism.
Figures 2, 3:
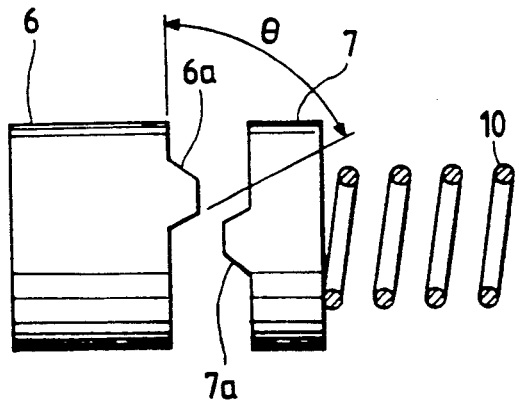
FIG. 2 is a cross-sectional view of a clutch mechanism used in the conventional quick-return motion mechanism.
FIG. 3 is an illustration for describing transmission members used in the conventional quick-return motion mechanism.
Figure 4:
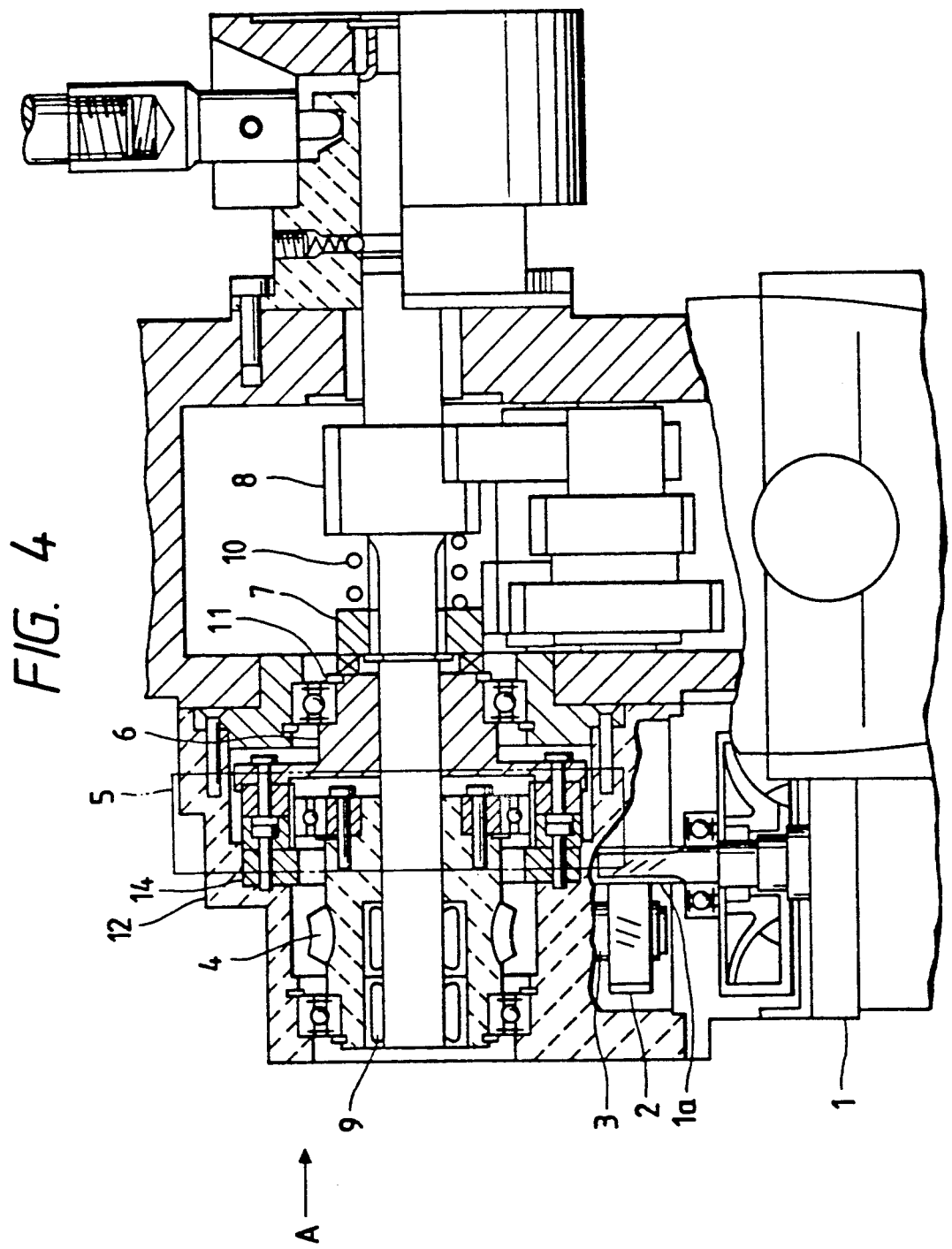
FIG. 4 is a cross-sectional view of a quick-return motion mechanism for use in an automatic magnetic drilling machine according to an embodiment of the present invention.

Referring now to FIG. 4, there is illustrated a quick-return motion mechanism for use in an automatic magnetic drilling machine according to an embodiment of the present invention in which parts corresponding to those in FIG. 1 showing the conventional quick-return motion mechanism are marked with the same numerals and the description thereof will be omitted for brevity. In FIG. 4, one feature of this embodiment is to provide a means to restrain the input side element 5a of a high-ratio reduction gear 5 on feeding and, on the other hand, to release it on return to race the high-ratio reduction gear 5. Such a means is constructed with a clutch 14 fixed secured to the input side element 5a of the high-ratio reduction gear 5, a stopper 16 having at one end a roller 15 engageable with the clutch 14, a plunger 17 coupled to the other end of the stopper 16, and a solenoid coil 18 disposed around the plunger 17 for allowing attraction of the plunger 17. This arrangement can provide an effect that a power is transferred through the high-ratio reduction gear 5 on feeding and, on the other hand, a handle shaft 8 is directly rotatable due to an input side gear on return, thereby allowing quick and sure return operation.

Figure 5:
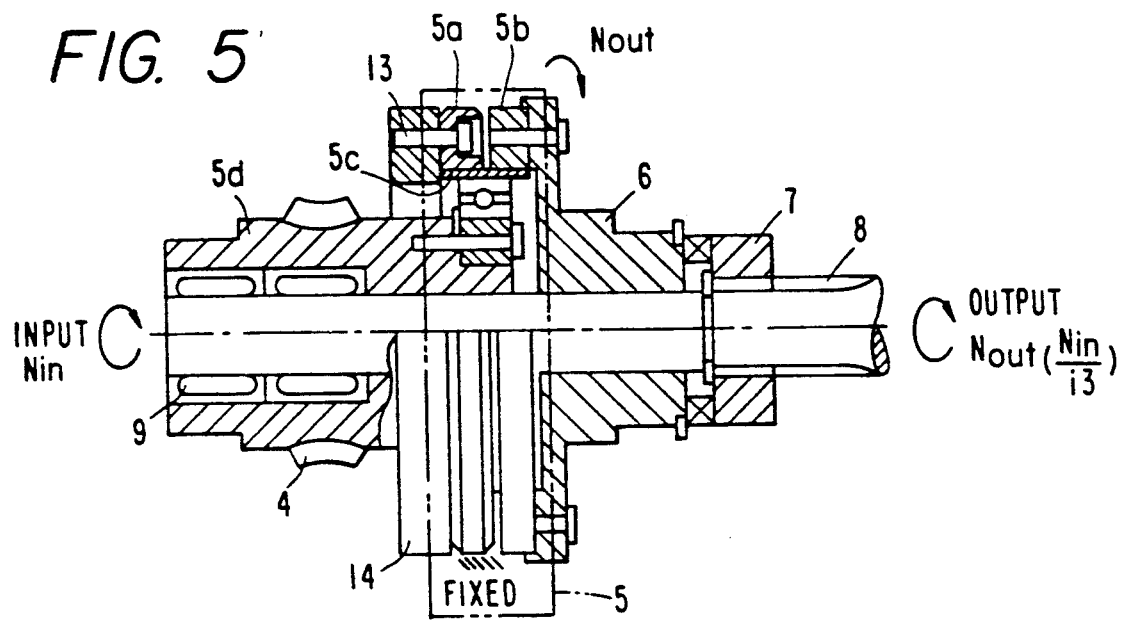
FIG. 5 is a cross-sectional view for describing an automatic feed state of the FIG. 4 quick-return motion mechanism.

As depicted in FIG. 5, the high-ratio reduction gear 5 comprises elements 5a to 5d, wherein element 5a is an input side element and the element 5d is an output side element. Clutch 14 is fixed through a bolt 13 to the input side element 5a.

Figure 7:
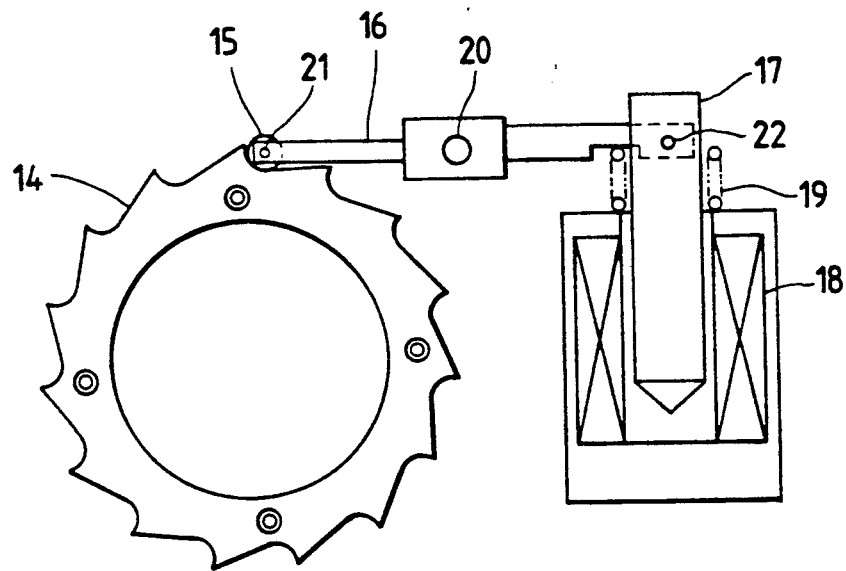
FIG 7 is an illustration for describing the relationship between a stopper and clutch on feed, the illustration being viewed from an arrow A in FIG. 4.

As depicted in FIG. 7, to a gear cover 12 are attached the solenoid coil 18, the plunger 17, a spring 19, a fulcrum shaft 20, and the stopper 16 having at its one end the roller 15 provided thereto through a pin 21 so as to be rotatable. The plunger 17 and the stopper 16 are loosely engaged with each other through a pin 22.

Under control of a control circuit (not shown), on automatic feeding, the solenoid coil 18 is deenergized so that the plunger 17 is pressed upwardly by means of the spring 19 so as to cause the roller 15 provided at the end portion of the stopper 16 to be engageable with a tooth of the clutch 14 in accordance with the leverage, whereby the clutch 14 is fixed by means of the stopper 16 which is in turn supported by the shaft 20. On the other hand, as illustrated in FIG. 8, on automatic return, the solenoid coil 18 is energized so as to cause the plunger 17 to be attracted downwardly so that the roller 15 is separated from the clutch 14 which is in turn rotatable.

Operation of the quick-return motion mechanism thus arranged will be described hereinbelow. FIG. 5 shows the automatic feeding state wherein feed motor 1 rotates in the left direction so that the worm wheel 4 and the high-ratio reduction gear 5 are responsive through the first gear 2 and the worm 3 to power from the feed motor 1 so as to be rotated at To. Under the control of the control circuit, the solenoid coil 18 is in the deenergized state to cause the clutch 14 and the input side element 5a to be fixed by means of the stopper 16, whereby power of the worm wheel 4 is transferred to the high-ratio reduction gear 5 and the clutches 6, 7 and the handle shaft 8 is rotated in the right direction at a rotational speed of Nin/i3 (Nout in FIGS. 5 and 6) where Nin represents the input side rotational speed and i3 designates the reduction ratio of the high-ratio reduction gear 5.

Figure 6:
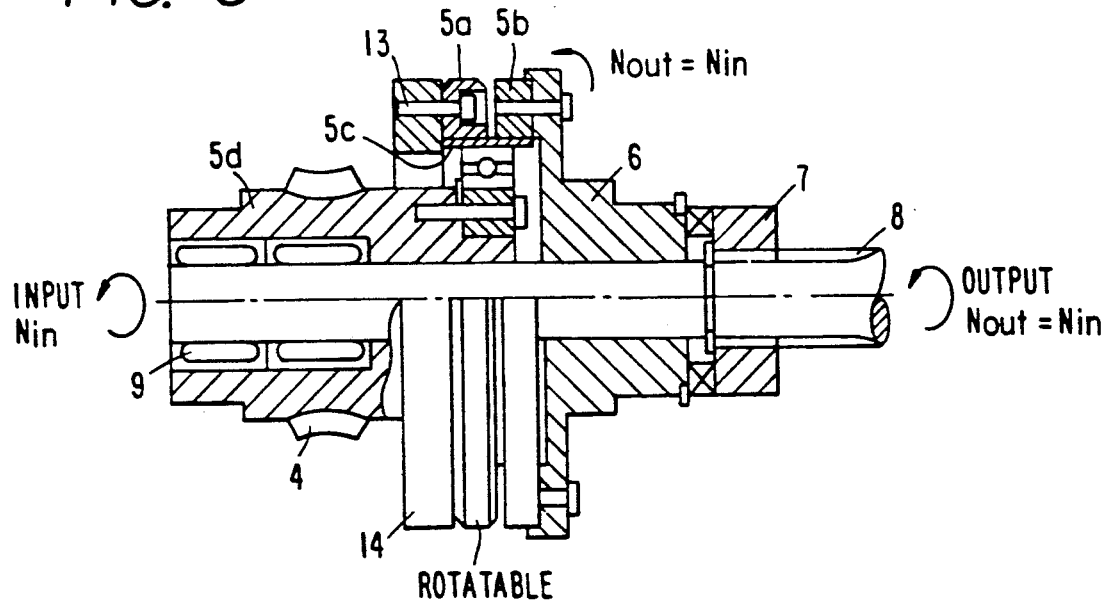
FIG. 6 is a cross-sectional view for describing an automatic return state of the FIG. 4 quick-return motion mechanism.
Figure 8:
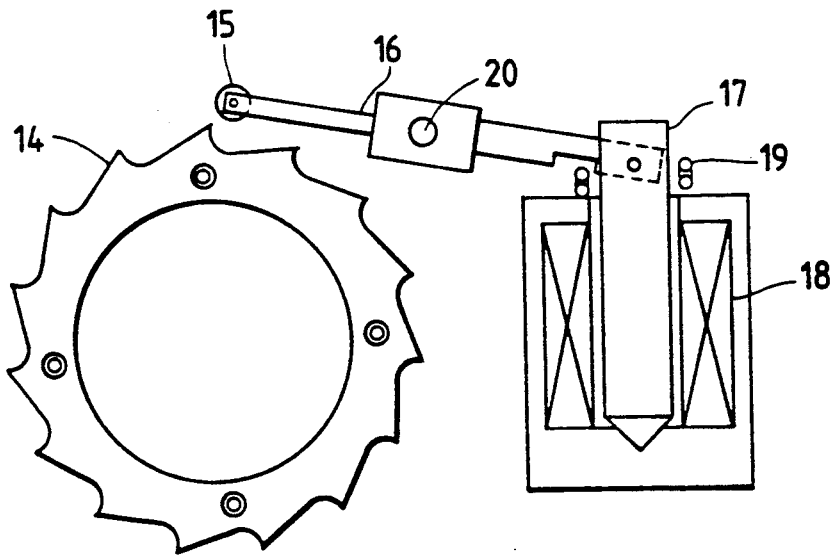
FIG. 8 is an illustration for describing the relationship between the stopper and clutch on return, the illustration being viewed from the arrow A in FIG. 4.

On the other hand, as illustrated in FIG. 6, on the automatic return, under the control of the control circuit, the feed motor 1 rotates in the reverse direction (right direction) so that, as illustrated in FIG. 8, the solenoid coil 18 is energized to cause the clutch 14 to be disconnected from the stopper 16 whereby the clutch 14 and the input side element 5a enter into the rotatable states, respectively.

On the other hand, due to the one-way clutch 9, the worm wheel 4 and the handle shaft 8 are locked. The power of the feed motor 1 is transferred through the first gear 2 and the worm 3 to the worm wheel 4 whereby the worm wheel 4, the whole of the high-ratio reduction gear 5, the clutches 6, 7 and the handle shaft 8 are simultaneously rotated at the input rotational speed Nin. Thus, the rotational speed on the return becomes i3 times the rotational speed on feeding, thereby allowing a large increase in the return speed under the control of the rotational speed of the feed motor 1.

According to this embodiment, since the clutch is arranged so as not to be slipped on return the reduction ratios on feeding and return are different from each other, and it is possible to quickly and surely perform the return operation to improve the work efficiency.

It should be understood that the foregoing relates to only a preferred embodiment of the present invention, and that it is intended to cover all changes and modifications of the embodiment of this invention herein used for the purposes of the disclosure, which do not constitute departures from the spirit and scope of this invention. For example, although in this embodiment the roller 15 is provided at the end portion of the stopper 16 in order to reduce the friction between the stopper 16 and the clutch 14 generated in disconnection, it is appropriate that the roller 15, the pin 22 and the stopper 16 are integrally constructed under the condition that the stopper 16 is made of a material whose frictional coefficient is small or has a configuration to reduce the frictional force or under the condition that the attraction force due to the solenoid coil 18 is increased. Further, although in this embodiment the solenoid coil 18 is used for attracting the plunger 17, it is also appropriate to use a spring which can restore the original configuration, for example. Still further, although in this embodiment the clutch 14 is fixed through the bolt 13 to the input side element 5a, it is appropriate that the configuration of the input side element 5a is improved so that the input side element 5a and the clutch 14 are integrally constructed.

What is claimed is:

1. In an automatic magnetic drilling machine including a feed motor for generating power which is in turn transferred through a worm wheel and a high-ratio reduction gear to a handle shaft to drive an electric drill, and further including a quick return motion mechanism having a one-way clutch inside said worm wheel so that said handle shaft races on feed and is locked on return, said high-ratio reduction gear including input and output side elements which are arranged to cause the input and output sides of said high-ratio reduction gear to rotate in the same direction, the improvement comprising said quick-return motion mechanism including means for restraining the input side element of said high-ratio reduction gear on feed and for releasing it on return to race said high-ratio reduction gear.

2. In an automatic magnetic drilling machine including a feed motor for generating power which is in turn transferred through a worm wheel and a high-ratio reduction gear to a handle shaft to drive an electric drill, and further including a quick return motion mechanism having a one-way clutch inside said worm wheel so that said handle shaft races on feed and is locked on return, said high-ratio reduction gear including input and output side elements which are arranged to cause the input and output sides of said high-ratio reduction gear to rotate in the same direction, the improvement comprising said quick-return motion mechanism including means for restraining the input side element of said high-ratio reduction gear on feed and for releasing it on return to race said high-ratio reduction gear, wherein said means is composed of a clutch fixed to the input side element of said high-ratio reduction gear, a stopper having at one end a roller engageable with said clutch fixed thereto, a plunger coupled to the other end of said stopper, and a solenoid coil provided around said plunger to attract said plunger.

* * * * *